United States Patent
Yanagisawa et al.

(10) Patent No.: US 8,259,157 B2
(45) Date of Patent: Sep. 4, 2012

(54) TELECONFERENCE TERMINAL APPARATUS AND IMAGE TRANSMITTING METHOD

(75) Inventors: Junichi Yanagisawa, Kanagawa (JP); Takayoshi Kawaguchi, Kanagawa (JP)

(73) Assignee: Sony Corporation (JP)

( * ) Notice: Subject to any disclaimer, the term of this patent is extended or adjusted under 35 U.S.C. 154(b) by 911 days.

(21) Appl. No.: 12/319,529

(22) Filed: Jan. 8, 2009

(65) Prior Publication Data

US 2009/0179982 A1 Jul. 16, 2009

(30) Foreign Application Priority Data

Jan. 11, 2008 (JP) ................................ P2008-004424
Aug. 20, 2008 (JP) ................................ P2008-211624

(51) Int. Cl.
*H04N 7/14* (2006.01)

(52) U.S. Cl. .................. 348/14.1; 348/14.08; 348/14.12

(58) Field of Classification Search .... 348/14.01–14.16, 348/211.12; 704/275, 246, 231
See application file for complete search history.

(56) References Cited

U.S. PATENT DOCUMENTS

| | | | | |
|---|---|---|---|---|
| 5,742,329 A | * | 4/1998 | Masunaga et al. | ......... 348/14.07 |
| 6,192,342 B1 | * | 2/2001 | Akst | ................ 704/275 |
| 2006/0012671 A1 | * | 1/2006 | Nimri et al. | ................. 348/14.08 |

FOREIGN PATENT DOCUMENTS

| | | |
|---|---|---|
| JP | 02203691 A | 8/1990 |
| JP | 3-131179 A | 6/1991 |
| JP | 7-322116 A | 12/1995 |
| JP | 09214923 A | 8/1997 |
| JP | 09284404 A | 10/1997 |
| JP | 2003274410 A | 9/2003 |
| JP | 2006-238325 A | 9/2006 |

OTHER PUBLICATIONS

Office Action from Japanese Application No. 2008-211624 dated Apr. 13, 2010.

* cited by examiner

*Primary Examiner* — Melur Ramakrishnaiah
(74) *Attorney, Agent, or Firm* — Lerner, David, Littenberg, Krumholz & Mentlik, LLP

(57) ABSTRACT

A teleconference terminal apparatus includes: imaging field changing control means for carrying out control of an imaging field changing unit designed to change the position of the imaging field of an imaging unit; preset information managing means; image signal transmitting means for outputting and transmitting an image signal to another teleconference terminal apparatus; still image generating means for generating still image information based on an image signal obtained by the imaging unit; and transmitted image control means for controlling the image signal transmitting means to transmit an image signal based on an image signal obtained by the imaging unit during a first period in which the imaging field changing control means does not carry out position changing control, and controlling the image signal transmitting means to transmit, during a second period in which the position changing control is carried out, an image signal based on still image information generated by the still image generating means when the second period is initiated.

6 Claims, 11 Drawing Sheets

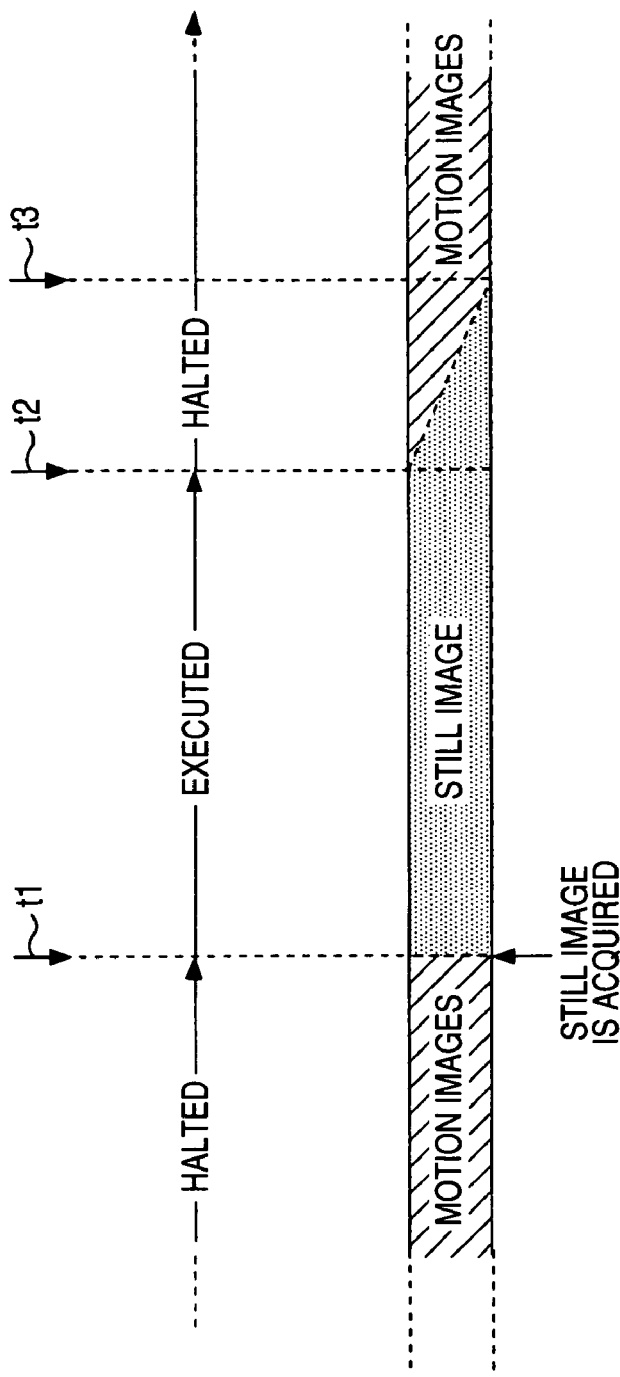

TELECONFERENCE TERMINAL APPARATUS AND IMAGE TRANSMITTING METHOD

CROSS REFERENCES TO RELATED APPLICATIONS

The present application claims priority from Japanese Patent Application Nos. JP 2008-004424 and JP 2008-211624 filed in the Japanese Patent Office on Jan. 11, 2008 and Aug. 20, 2008, respectively, the entire contents of which are incorporated herein by reference.

BACKGROUND OF THE INVENTION

1. Field of the Invention

The present invention relates to a teleconference terminal apparatus that can perform pan, tilt and zoom drive control for changing the imaging field of view of an imaging apparatus based on preregistered pan, tilt and zoom positional information and can output and transmit information on an image picked up by the imaging apparatus.

The present invention also relates to an image transmitting method applied to the teleconference terminal apparatus.

2. Description of the Related Art

In a teleconference system, terminal apparatus that support the teleconference system are provided in respective conference halls or other places remote from one another, and each of the terminal apparatus is connected to an imaging apparatus and a display apparatus. In a near-end conference hall, a picked-up image obtained by using the imaging apparatus to image conference participants or other objects in the conference hall is transmitted via the terminal apparatus to the terminal apparatus in a far-end different conference hall. The far-end terminal apparatus receives the picked-up image transmitted from the near end and displays it on the display apparatus connected to the terminal apparatus.

Each of the terminal apparatus is also connected to a microphone and a loudspeaker, and a signal containing audio from a near-end speaker picked up by the near-end microphone is transmitted to the far end via the terminal apparatus. The far-end terminal apparatus receives the audio signal and outputs it from the loudspeaker.

In such a teleconference system, the conference can proceed in such a way that conversation takes place while the display apparatus displays images picked up in the conference hall on the communication counterpart side.

In a teleconference system, the imaging field of view imaged by the imaging apparatus is preferably changed in some cases as the conference proceeds. For example, whenever a conference participant speaks, the speaking conference participant (speaker) is preferably zoomed up. In such a case, an imaging apparatus configured to carry out imaging, for example, with its imaging direction oriented toward a fixed point is unsuitable for the above purpose.

To address the above problem, there is a teleconference system in which an imaging apparatus is combined with a mounting base to perform what is called pan, tilt, and zoom control. In such a teleconference system, for example, when a new speaker appears, the imaging apparatus can image the speaker with the imaging field of view set to include the speaker by carrying out as appropriate pan, tilt, and zoom motion instruction operations.

In addition to this, there is a teleconference system having a pan, tilt, and zoom preset function in which combination patterns of pan, tilt, and zoom positions that correspond to specific imaging fields of view are set and stored (registered) in advance and the pan, tilt and zoom positional information of any one of the registered patterns is called up through a predetermined operation and set accordingly.

In this way, for example, whenever a speaker appears one after another, selecting and calling up as appropriate any of the combination patterns of pan, tilt and zoom positions allows the imaging field of view to be automatically changed in such a way that the speaker is zoomed up in a picked-up image.

JP-A-2006-238325 describes a camera system including tele/wide cameras in which when the tele-camera is controlled in terms of PTZ (pan, tilt and zoom) while displaying video images therefrom, tele-video images are clipped from wide-video images, if the wide-video images contain tele-video images, and the clipped tele-video images are enlarged or otherwise processed to be used in place of live tele-video images. The pseudo tele-video images are then switched to actual live tele-video images after the tele-camera has been moved and stopped. In this way, stable video images can be displayed and recorded during the tele-camera is moving.

SUMMARY OF THE INVENTION

When the pan, tilt and zoom preset function described above is used to change the imaging field of view of the imaging apparatus, pan, tilt and zoom mechanisms are typically moved at relatively high speeds because target pan, tilt and zoom positions are known. In this case, images (motion images) picked up when the pan, tilt and zoom positions are being changed based on the preset function include very-fast-moving objects. Some users feel uncomfortable with such fast-moving images, and it is preferable to eliminate such a problem.

In consideration of the problem described above, a teleconference terminal apparatus according to an embodiment of the invention is configured as follows:

That is, a teleconference terminal apparatus according to an embodiment of the invention includes imaging field changing control means for carrying out control for changing the position of an imaging field changing unit designed to change the position of the imaging field of view of an imaging unit that forms a teleconference system, preset information managing means for holding and managing preset information including positional information that specifies the position of the imaging field changing unit, image signal transmitting means for outputting and transmitting an image signal to another teleconference terminal apparatus, the image signal used to display an image on a display apparatus provided in the other teleconference terminal apparatus, still image generating means for generating still image information based on a picked-up image signal obtained through imaging performed by the imaging unit, and transmitted image control means for controlling the image signal transmitting means to transmit an image signal based on a picked-up image signal obtained through imaging performed by the imaging unit during a first period in which the imaging field changing control means does not carry out position changing control for changing the position of the field view changing unit based on the positional information in the preset information, and controlling the image signal transmitting means to transmit, during a second period in which the position changing control is carried out, an image signal based on still image information generated by the still image generating means when the second period is initiated.

The "imaging field of view" used herein corresponds to, for example, the range of an image picked up by the imaging unit with surrounding objects removed. The "imaging field of view" changes when the imaging direction of the imaging unit is moved in the pan or tilt direction. The "imaging field of view" also changes when the angle of view (zoom) of the imaging unit is changed.

The "position of the imaging field changing unit" used herein is the position of a movable mechanism in the imaging field changing unit. For the pan and tilt mechanisms, for example, the position thereof can be expressed by the angle of rotation with reference to a predetermined position. For the zoom mechanism, the position thereof can be expressed by the position of a zoom lens. Each of the pan, tilt, and zoom mechanisms is driven by a motor, so that the position thereof can also be obtained from the information on the rotational position of the motor.

According to the above configuration, the teleconference terminal apparatus according to the embodiment of the invention is provided with the function of presetting the imaging field of view, the preset function allowing the imaging field of view of the imaging unit to be changed by carrying out position changing control on the imaging field changing unit based on preset information. During the period in which the position changing control is carried out based on the function of presetting the imaging field of view, an image signal based on still image information is transmitted to another teleconference terminal apparatus. That is, for example, assuming that the other teleconference terminal apparatus is configured to operate in such a way that a received image signal is simply outputted and displayed, the other teleconference terminal apparatus display a still image during the period in which the position changing control is carried out.

As described above, according to the embodiment of the invention, during a period in which a teleconference terminal apparatus on the transmitting side is carrying out the position changing control on the imaging field changing unit based on preset information, another teleconference terminal apparatus to which an image signal is transmitted does not display fast-moving images picked up during the period in which the position changing control is being carried out, but instead displays a still image. In this way, a user on the other teleconference terminal apparatus side will not feel uncomfortable with images transmitted from the teleconference terminal apparatus on the transmitting side. The teleconference system therefore becomes, for example, more user-friendly.

BRIEF DESCRIPTION OF THE DRAWINGS

FIGS. 7A and 7B show the relationship between PTZ drive control in the near-end teleconference terminal apparatus and an example of change in received image displayed on the display apparatus in the far-end teleconference terminal apparatus in a second embodiment;

DESCRIPTION OF THE PREFERRED EMBODIMENTS

The best mode for carrying out the invention (hereinafter referred to as an embodiment) will be described in the following order.

<1. First Embodiment>
[Exemplary System Configuration]
[PTZ Preset Function]
[Display Actions in Response to PTZ Drive Control (First Embodiment)]
[Exemplary Process Procedure]
<2. Second Embodiment>
[Display Actions in Response to PTZ Drive Control (Second Embodiment)]
[Exemplary Configuration of Image Signal Processing/Display Controller]
[Exemplary Process Actions]
<1. First Embodiment>
[Exemplary System Configuration]

In the present embodiment, the invention is applied to a video transceiver in a television conference system (teleconference system).

The teleconference system is configured in such a way that teleconference terminal apparatus, each of which is a communication terminal, are installed in conference halls in different places, and a teleconference terminal apparatus transmits an image picked up by an imaging apparatus and audio picked up by a microphone to a teleconference terminal apparatus in a different place, receives an image and audio transmitted from the teleconference terminal apparatus in the different place, and outputs them on a display apparatus and from a loudspeaker, respectively. That is, the teleconference system includes a video transceiver that transmits and receives images back and forth, and an audio transceiver that transmits and receives audio back and forth. The present embodiment corresponds to a system having a core teleconference terminal apparatus as the video transceiver provided to transmit and receive a picked-up image.

First, a first embodiment will be described.

Figure 1:
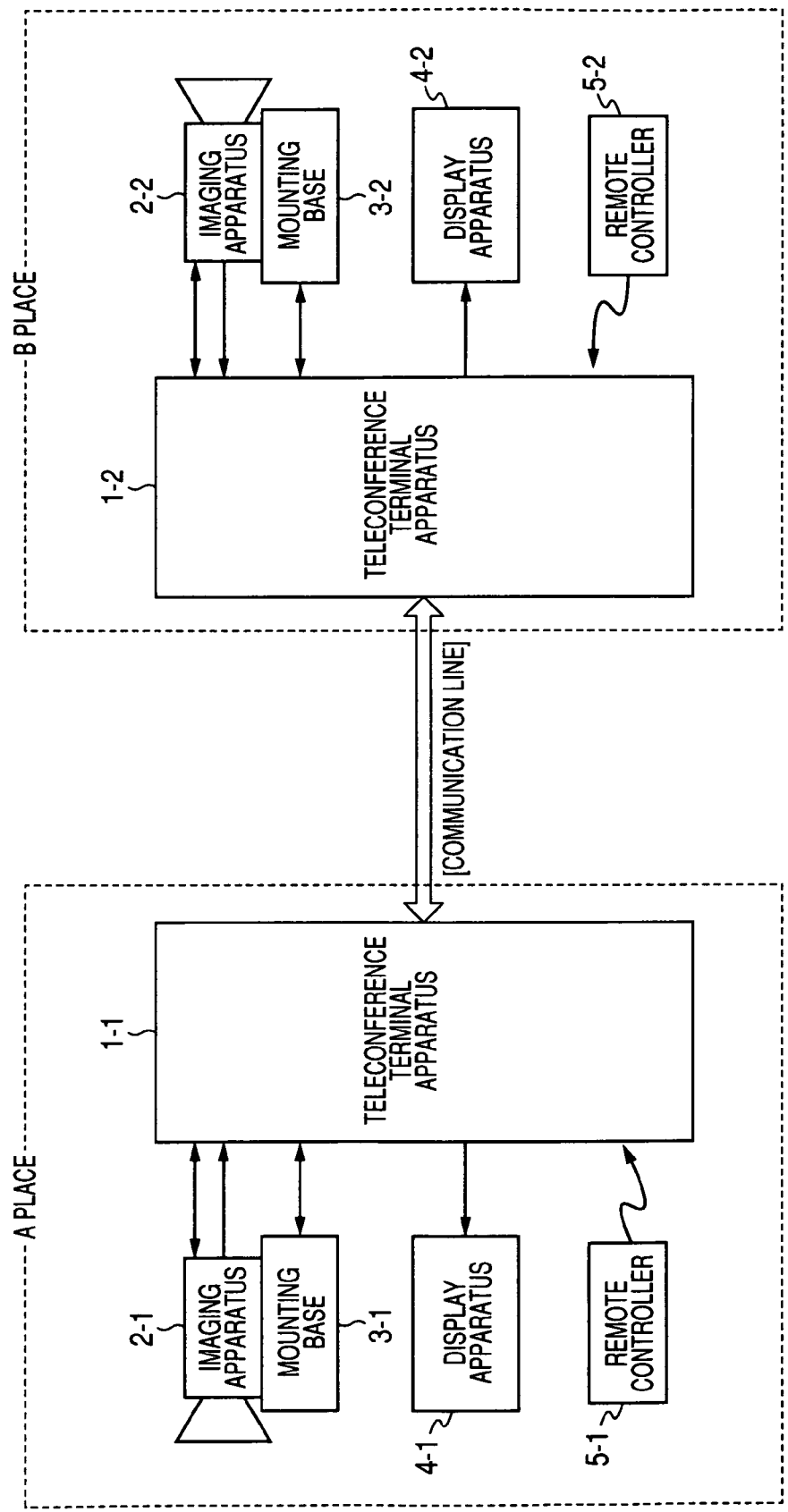
FIG. 1 shows an exemplary configuration of a teleconference system according to an embodiment of the invention.

FIG. 1 shows an exemplary system configuration primarily includes a video transceiver in a teleconference system according to the first embodiment.

In this case, two places A and B remote from each other are conference halls, and teleconference terminal apparatus 1-1 and 1-2 are installed in the places A and B, respectively. The teleconference terminal apparatus 1-1 and 1-2 are connected to each other by a communication line that supports a predetermined communication scheme for two-way communication. Imaging apparatus 2-1, 2-2 and display apparatus 4-1, 4-2 are also provided in the places A and B, respectively. The imaging apparatus 2-1, 2-2 are equipped with zoom mechanisms for adjusting the angle of view and attached to mounting bases 3-1, 3-2. Each of the mounting bases 3-1, 3-2 includes a pan mechanism and a tilt mechanism so that the imaging direction (imaging field of view) of the attached imaging apparatus can be changed within a predetermined angular range in the up-down direction and the right-left direction.

Also provided are remote controllers 5-1, 5-2 by which users remotely control the actions of the teleconference terminal apparatus 1-1, 1-2, respectively.

In the following description, when it is not particularly necessary to distinguish among the teleconference terminal apparatus, imaging apparatus, mounting bases, display apparatus, and remote controllers installed in separate places, they will be called teleconference terminal apparatus 1, imaging apparatus 2, mounting bases 3, display apparatus 4, and remote controllers 5.

An audio transceiver is not illustrated in FIG. 1.

Basic actions of the video transceivers shown in FIG. 1 are, for example, summarized as follows:

First, in the place A, an image signal containing motion images picked up by the imaging apparatus 2-1 is inputted to the teleconference terminal apparatus 1-1. The teleconference terminal apparatus 1-1 transmits the inputted image signal to the teleconference terminal apparatus 1-2 through the communication line. The teleconference terminal apparatus 1-2 receives the thus transmitted image signal and outputs it on the display apparatus 4-2.

Similarly, the teleconference terminal apparatus 1-2 transmits an image signal picked up by the imaging apparatus 2-2 in the place B to the teleconference terminal apparatus 1-1. The teleconference terminal apparatus 1-1 outputs the received image signal on the display apparatus 4-1.

The video transceivers in the teleconference system thus carry out two-way video communication, whereby a conference participant present in a certain place, for example, can visually understand how the conference in another place proceeds. For example, when an imaging apparatus 2 in a conference hall is imaging a present speaker in such a way that the imaging field of view is set to zoom up the speaker, a display apparatus 4 in another conference hall can display an image containing the zoomed-up speaker.

The "imaging field of view" used herein corresponds to, for example, the range of an image actually picked up within an imageable range of the imaging apparatus 2 so that surrounding objects are removed. The "imaging field of view" changes when the imaging direction of the imaging apparatus 2 is moved in the pan or tilt direction. The "imaging field of view" also changes when the angle of view (zoom) of the imaging apparatus 2 is changed.

Figure 2:
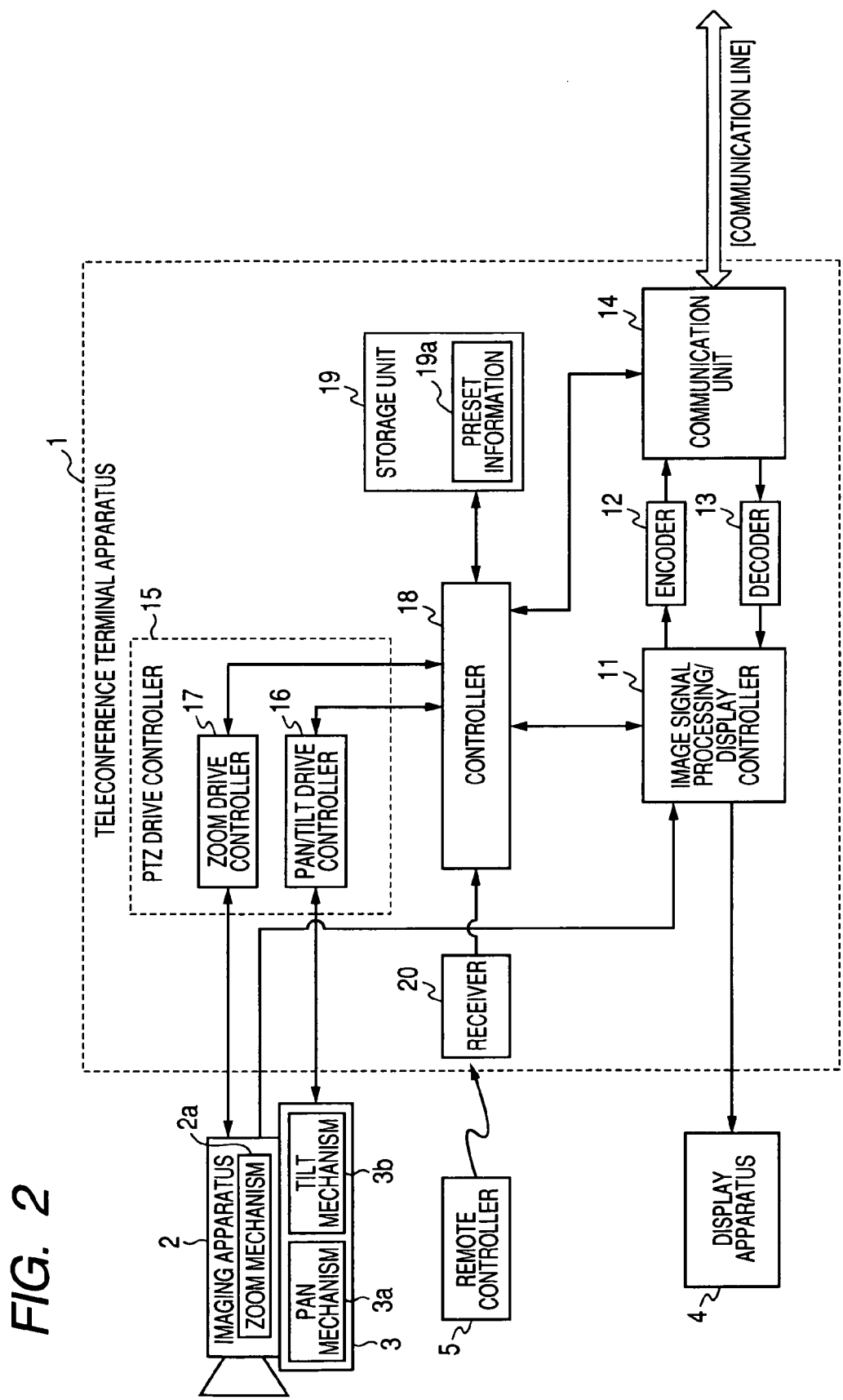
FIG. 2 shows an exemplary internal configuration of a teleconference terminal apparatus of the present embodiment along with an imaging apparatus, a display apparatus, and other components connected to the teleconference terminal apparatus.

FIG. 2 shows a teleconference system installed in a single place, along with an exemplary internal configuration of the teleconference terminal apparatus 1. In relation to FIG. 1, each of the teleconference terminal apparatus 1-1 and 1-2 can be considered to have the same configuration shown in FIG. 2. In FIG. 2, the portion that corresponds to an audio transceiver is not illustrated.

The imaging apparatus 2 in this case includes an imaging optical system and a signal processor that uses image light to produce an image signal containing non-compressed motion images. The image signal (picked-up image signal) outputted from the imaging apparatus 2 is inputted to an image signal processing/display controller 11 in the teleconference terminal apparatus 1.

The optical system of the imaging apparatus 2 is equipped with a zoom mechanism 2a that moves the position of a zoom lens to change the angle of view.

The mounting base 3 includes a pan mechanism 3a that changes the imaging field of view of the imaging apparatus 2 attached to the mounting base 3 in the right-left direction and a tilt mechanism 3b that changes the imaging field of view in the up-down direction.

The image signal processing/display controller 11 performs predetermined signal processing on the inputted image signal as necessary and performs display control for displaying an image on the display apparatus 4.

For example, the image signal processing/display controller 11 performs necessary signal processing on the picked-up image signal inputted from the imaging apparatus 2 as necessary and then transfers the resultant signal to an encoder 12.

The encoder 12 performs image compression coding based on a predetermined scheme on the inputted image signal and transfers the resultant signal to a communication unit 14. The communication unit 14 transmits the compression-coded image signal (compressed image signal) transferred from the encoder 12 to a teleconference terminal apparatus in a different place via the communication line under the control of a controller 18 in accordance with a predetermined communication scheme.

The communication unit 14 receives compressed image signal transmitted from the teleconference terminal apparatus in the different place and transfers the compressed image signal to a decoder 13.

The decoder 13 performs decoding against the image compression coding on the inputted compressed image signal to provide an image signal in a predetermined format. The thus obtained image signal is transferred to the image signal processing/display controller 11.

The image signal processing/display controller 11 can carry out display control for displaying an image, for example, based on the image signal thus transferred from the decoder 13 on the display apparatus 4. In this way, an image picked up in another conference hall is displayed on the display apparatus 4.

The image signal processing/display controller 11 can also carry out display control for displaying the picked-up image signal on the display apparatus 4 in a predetermined format.

Further, the image signal processing/display controller 11 can carry out image generation and display control for displaying a variety of operation images on the display apparatus 4 under the control of the controller 18.

Part or all of the functions of the image signal processing/display controller 11 can be achieved by a DSP (Digital Signal Processor).

The teleconference terminal apparatus 1 has a function of changing the imaging field of view of the imaging apparatus 2. The imaging field of view in this case is changed by controlling panning, tilting, and zooming in combination. In the pan and tilt control, the imaging direction of the imaging apparatus 2 (imaging field of view) is changed in the right-left and up-down directions, and in the zoom control, the angle of view of the imaging apparatus 2 is changed. To this end, the teleconference terminal apparatus 1 includes a PTZ (Pan (Panning), Tilt (Tilting), Zoom (Zooming)) drive controller 15.

The PTZ drive controller 15 includes a pan/tilt drive controller 16 and a zoom drive controller 17, as shown in FIG. 2.

The pan/tilt drive controller 16 produces and outputs a drive signal for driving a pan motor in the pan mechanism 3a provided in the mounting base 3 in accordance with instruction information on the amount of movement in the pan direction provided from the controller 18. Similarly, the pan/tilt drive controller 16 produces and outputs a drive signal for driving a tilt motor in the tilt mechanism 3b provided in the mounting base 3 in accordance with instruction information on the amount of movement in the tilt direction provided from the controller 18. It is thus possible to change the imaging direction, as the imaging field of view of the imaging apparatus 2, in the right-left direction (pan direction) and the up-down direction (tilt direction).

The zoom drive controller 17 produces and outputs a drive signal for driving a zoom motor in the zoom mechanism 2a provided in the optical system in the imaging apparatus 2 in accordance with instruction information on the amount of change in angle of view provided from the controller 18. It is thus possible to change the angle of view as the imaging field of view.

The controller 18 includes, for example, a microcomputer including a CPU, a ROM, and a RAM, and controls the entire teleconference terminal apparatus 1.

A storage unit 19 includes, for example, a non-volatile storage device and stores a variety of programs, data, and other information necessary for the controller 18. Further, in the present embodiment, the storage unit 19 stores preset information 19a that corresponds to PTZ preset function, which will be described later.

The remote controller 5 includes necessary operation members used by a user to carry out a variety of operations to operate the teleconference terminal apparatus 1. The remote controller 5 transmits an operation information signal by means of, for example, infrared light or radio waves in accordance with an operation through any of the operation members. A receiver 20 receives the operation information signal, decodes it, and outputs it to the controller 18. The controller 18 carries out necessary control and processes in response to the inputted operation information signal.

[PTZ Preset Function]

The teleconference terminal apparatus 1 of the present embodiment has a PTZ preset function. The preset function will be described below.

In the PTZ preset function of the present embodiment, a combination of pan, tilt, and zoom positional information (PTZ positional information) necessary to determine a single imaging field of view is first registered in advance. The set of PTZ positional information thus registered is the preset information 19a stored in the storage unit 19.

Figure 3:
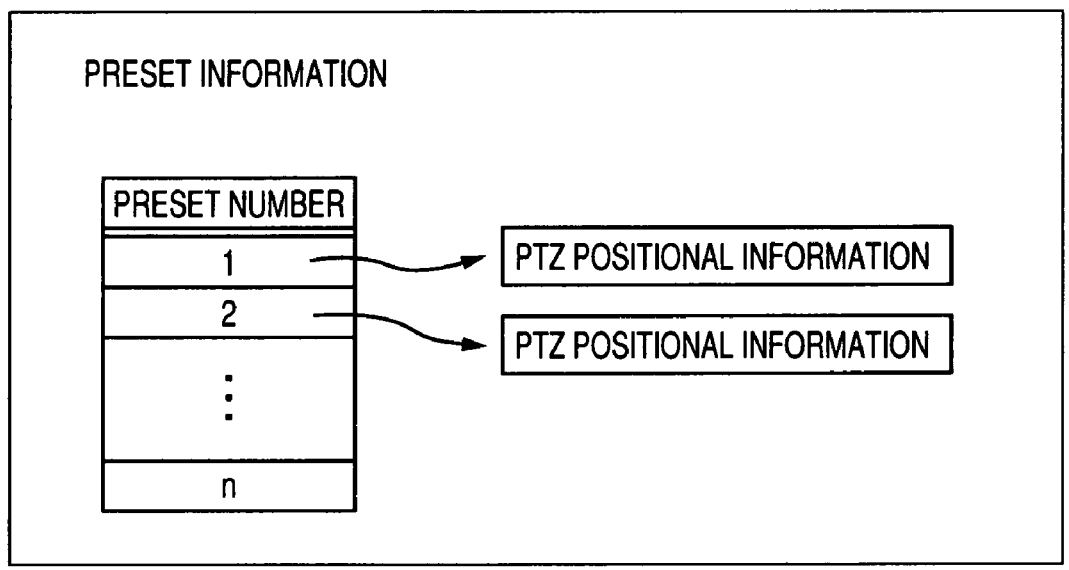
FIG. 3 shows an exemplary structure of preset information according to an embodiment.

FIG. 3 diagrammatically shows an exemplary structure of the preset information 19a stored in the storage unit 19. As shown in FIG. 3, the preset information 19a has a structure in which, for example, a predetermined number of preset numbers 1 to n prepared in advance are related to respective PTZ positional information (alternatively, the number of the preset numbers may not be necessarily limited to a particular value). When any PTZ positional information is related to a preset number, the preset number has been already registered, whereas when no PTZ positional information is related a preset number, the preset number has not been registered.

The pan, tilt, and zoom positions indicated by the PTZ positional information (positions of imaging field changing portions) are the positions of movable portions of the pan mechanism 3a, the tilt mechanism 3b, and the zoom mechanism 2a. For example, the position of each of the pan mechanism 3a and the tilt mechanism 3b can be expressed by an angle of rotation with reference to a predetermined position. The position of the zoom mechanism 2a can be expressed by the position of the zoom lens. Each of the pan mechanism 3a, the tilt mechanism 3b, and the zoom mechanism 2a is moved by a motor, so that the position of each of the mechanisms can also be obtained by the rotational position of the motor.

In the present embodiment, in response to a user's operation of selecting a preset number (PTZ preset operation), for example, through the controller 5, the controller 18 reads preregistered PTZ positional information that corresponds to the selected preset number from the preset information 19a. The controller 18 further controls the PTZ drive controller 15 in such a way that the pan mechanism 3a and the tilt mechanism 3b in the mounting base 3 and the zoom mechanism 2a in the imaging apparatus 2 are driven and moved (PTZ drive control) to the PTZ positions based on the read PTZ positional information. In this way, the imaging field of view set in advance for the preset number selected by the user can be automatically obtained.

As the preset operation, for example, operation members that correspond to the preset numbers may be provided on the remote controller 5, and the user may select any of the preset numbers by directly operating the corresponding operation member.

Alternatively, a GUI (Graphical User Interface) through which any of the preset numbers displayed on the display apparatus 4 can be selected may be used to allow the user to select any of the preset numbers by operating the corresponding operation member provided on the remote controller 5.

As described above, the teleconference terminal apparatus 1 of the present embodiment has the PTZ preset function. The user can thus readily obtain an imaging field of view set in advance by selecting and entering a preset number. For example, registering PTZ positional information that corresponds to the imaging field of view for each zoomed-up conference participant in the preset information 19a allows the imaging field of view to be quickly and suitably switched whenever a speaker appears one after another in the course of a conference in such a way that the speaker is zoomed up in a picked-up image by selecting and entering the corresponding preset number.

[Display Actions in Response to PTZ Drive Control (First Embodiment)]

As described above with reference to FIGS. 1 and 2, the near-end teleconference terminal apparatus 1 (1-1) can transmit an image signal containing picked-up images picked up by the imaging apparatus 2-1 to the far-end teleconference terminal apparatus 1 (1-2). The far-end teleconference terminal apparatus 1-2 can receive the image signal transmitted from the near-end teleconference terminal apparatus 1-1 and output and display the images on the display apparatus 4-2 connected to the far-end teleconference terminal apparatus 1-2. In this way, conference participants in a certain conference hall can look at, for example, conference participants in another conference hall.

The near-end teleconference terminal apparatus 1-1 normally transmits an image signal containing picked-up motion images, and the far-end teleconference terminal apparatus 1-2 normally outputs and displays the received image signal in the form of motion images.

A description will be made of the relationship between the PTZ drive control carried out in the near-end teleconference terminal apparatus 1-1 in response to a PTZ preset operation and corresponding received images displayed on the display apparatus 4-2 in the far-end teleconference terminal apparatus 1-2 with reference to FIGS. 4A and 4B.

Figure 4:
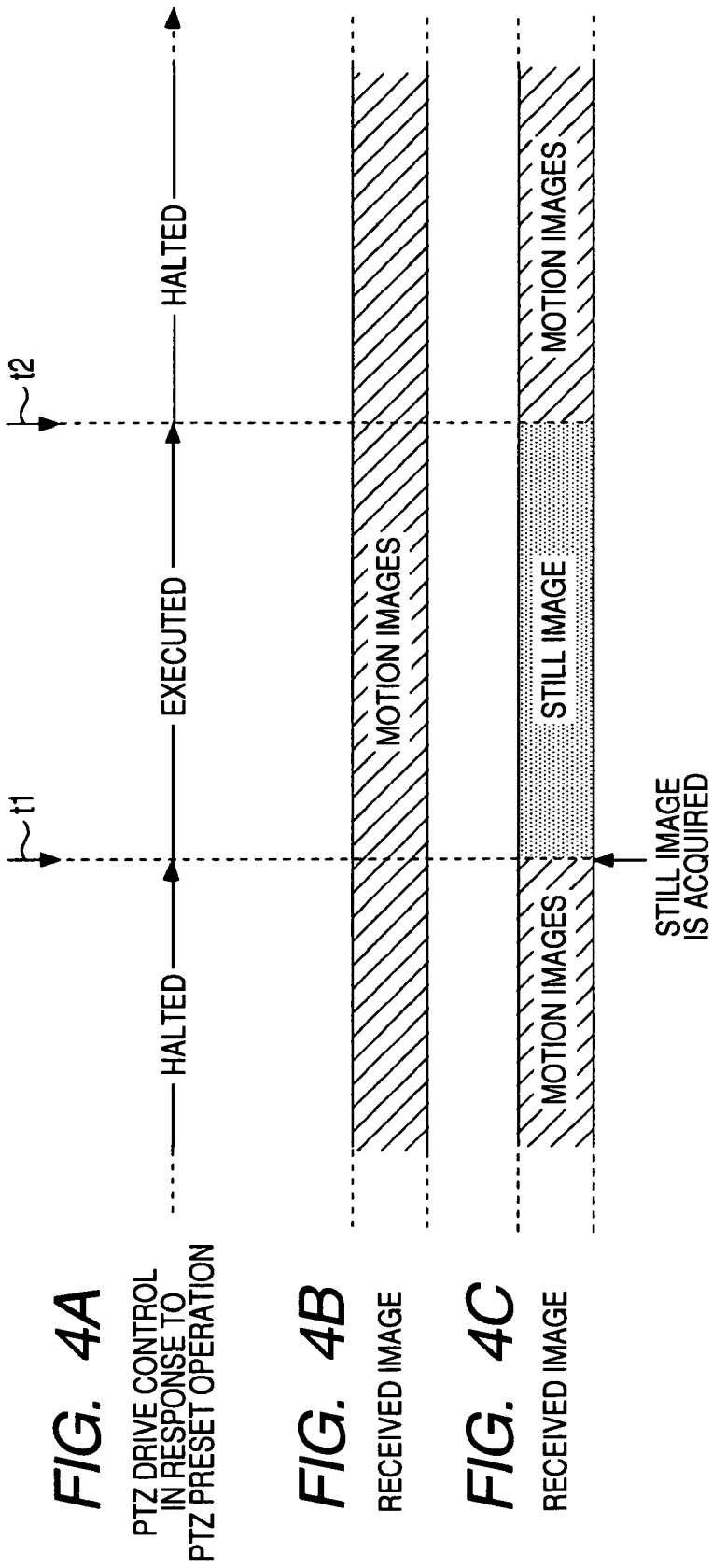
FIGS. 4A to 4C show the relationship between PTZ drive control in a near-end teleconference terminal apparatus and an example of change in received image displayed on a display apparatus in a far-end teleconference terminal apparatus in a first embodiment.

FIG. 4A shows an exemplary situation of the PTZ drive control in response to a PTZ preset operation carried out in the near-end teleconference terminal apparatus 1-1. In this case, before a point t1, the PTZ drive control is halted, and hence the imaging field of view picked up by the imaging apparatus 2 is fixed.

At the timing when the point t1 is reached, assume that a PTZ preset operation is carried out in the near-end teleconference terminal apparatus 1-1. In response to the PTZ preset operation, the controller 18 in the teleconference terminal apparatus 1-1 starts to carry out the PTZ drive control based on the PTZ positional information that corresponds to the preset number called up by the actual PTZ preset operation. In response to this, the imaging field of view of the imaging apparatus 2-1 changes in such a way that the pan, tilt, and zoom positions move to target values. At the timing when a certain length of time has passed from the point t1 and a point t2 is reached, assume that the movement to the target pan, tilt, and zoom positions is completed and the PTZ drive control is terminated. After the point t2, the PTZ drive control is halted again.

FIG. 4B shows the type of images (received images) outputted and displayed on the display apparatus 4-2 when the far-end teleconference terminal apparatus 1-2 receives an image signal transmitted from the near-end teleconference terminal apparatus 1-1.

As described above, the near-end teleconference terminal apparatus 1-1 transmits an image signal containing picked-up motion images, and the far-end teleconference terminal apparatus 1-2 normally displays the image signal in the form of motion images. The display apparatus 4-2 in the far-end teleconference terminal apparatus 1-2 therefore constantly displays motion images as the received images irrespective of whether or not the near-end teleconference terminal apparatus 1-1 is carrying out PTZ drive control, as shown in FIG. 4B.

However, the received motion images displayed during the period from t1 to t2 in FIG. 4B are those imaged in a situation where the imaging field of view of the imaging apparatus 2-1 changes, so that the displayed images move and change more greatly than in the situation where no PTZ drive control is carried out and hence the imaging field of view is fixed. In particular, in the PTZ drive control in response to a PTZ preset operation, the speeds at which the pan, tilt, and zoom mechanisms are moved is often designed to be relatively higher than, for example, those at which pan, tilt, and zoom operations are manually carried out, because target pan, tilt, and zoom positions are known. Therefore, motion images picked up during the execution of the PTZ drive control in response to a PTZ preset operation significantly move and change in some cases. Such images show transiting imaging field of view and are hence not very meaningful. They are rather visually undesirable and may cause the user to feel uncomfortable, such as "camera sickness" or a feeling akin to "camera sickness". In consideration of this, it is not preferable to directly display picked-up images while the PTZ drive control is being carried out.

To address the problem, in the present embodiment, as the action according to the PTZ drive control in response to a PTZ preset operation, for example, shown in FIG. 4A, the display apparatus 4-2 in the far-end teleconference terminal apparatus 1-2 displays received images shown in FIG. 4C.

That is, before the point t1 when the PTZ drive control is initiated in response to a PTZ preset operation, the near-end teleconference terminal apparatus 1-1 transmits an image signal containing motion images picked up by the imaging apparatus 2-1, as in the normal case. In response to this, the far-end display apparatus 4-2 displays the received images in the form of motion images.

When the point t1, when the PTZ drive control is initiated in response to a PTZ preset operation, is reached, the near-end teleconference terminal apparatus 1-1 extracts still image data (still image information) from the image signal (picked-up motion image signal) obtained through imaging performed by the imaging apparatus 2-1 at a predetermined timing that corresponds to the point t1. To this end, single frame image data may be extracted from the picked-up motion image signal. The teleconference terminal apparatus 1-1 then transmits an image signal (still image signal) produced in such a way that a still image based on the still image data is continuously displayed, instead of the image signal containing picked-up motion images (picked-up motion image signal) that have been displayed. The still image signal is continuously transmitted until a predetermined timing that corresponds to the point t2 when the PTZ drive control is completed and halted. Thereafter, during a period in which the PTZ drive control is halted, the transmission of the still image signal is switched to the transmission of picked-up motion image data, as in the period before the point t1.

In this way, since operating the near-end teleconference terminal apparatus 1-1 allows the far-end teleconference terminal apparatus 1-2 to receive, output and, display a still image signal during the period from the point t1 to the point t2, a still image is displayed as the received image, as shown in FIG. 4C. After the timing that corresponds to the point t2, since the image signal received by the far-end teleconference terminal apparatus 1-2 is switched from a still image signal to a picked-up motion image signal, the received image is also switched to motion images.

In this way, in the present embodiment, when the PTZ drive control is not carried out, motion images are normally displayed as received images, whereas when the PTZ drive control is carried out in response to a PTZ preset operation, a still image can be continuously displayed as a received image.

That is, in the present embodiment, images whose imaging field of view subject to change due to the PTZ drive control in response to a PTZ preset operation will not be displayed. The user who is looking at received images will therefore not feel uncomfortable.

Further, in the present embodiment, a still image to be displayed is acquired from picked-up images at the timing when the PTZ drive control is initiated. That is, the displayed image is a still image having the same contents of the received motion images that have been displayed. It is thus possible to eliminate an uncomfortable feeling the user who is looking at the received image will have, for example, when no received image but a blue screen is displayed or when an image having nothing to do with received images that have been displayed.

When the teleconference terminal apparatus 1 transmits an image signal containing motion images, the image signal undergoes image compression coding based on a predetermined scheme in the encoder 12. Transmission of the thus compression-coded image information can be conceptually considered as transmission of only differential image information along the temporal axis. The amount of differential image data to be transmitted is smaller when movement in images is smaller, while being greater when movement in images is larger.

In consideration of this fact, for example, the image signal containing motion images transmitted from the near-end teleconference terminal apparatus 1-1 to the far-end teleconference terminal apparatus 1-2 during the period from point t1 to the point t2 in FIG. 4B in which the PTZ drive control is carried out has a significantly greater amount of differential information data than that in a period in which the PTZ drive control is halted and hence the imaging field of view is fixed. That is, in the case shown in FIG. 4B, during the period in which the PTZ drive control is being carried out in response to a PTZ preset operation, an image signal having a large amount of data is transmitted and inconveniently congests the traffic although the image signal does not provide useful images to the user as described above.

In contrast, in the present embodiment, since an image signal that corresponds to a still image is transmitted during the period in which the PTZ drive control is being carried out in response to a PTZ preset operation (corresponding to the period from the point t1 to the point t2 in FIG. 4C), the amount of data of the image signal to be transmitted is reduced. The burden on the traffic is thus reduced, whereby it is expected that, for example, images are stably communicated in the teleconference system.

To switch between motion images and a still image as a received image to be displayed, the image signal processing/display controller 11 in the near-end teleconference terminal apparatus 1-1 switches the image signal outputted to the encoder 12 between a picked-up motion image signal and a still image signal. That is, the switching of the received image between motion images and a still image used can be achieved by the action only in the near-end teleconference terminal apparatus 1-1. In other words, the far-end teleconference terminal apparatus 1-2, which receives an image signal, only needs to normally display the received image signal.

In the camera system described in JP-A-2006-238325 including tele/wide cameras, when the tele-camera is controlled in terms of PTZ (pan, tilt and zoom) while displaying video images therefrom, tele-video images are clipped from wide-video images, if the wide-video images contain tele-video images, and the clipped tele-video images are enlarged or otherwise processed to be used in place of live tele-video images. The pseudo tele-video images are then switched to actual live tele-video images after the tele-camera has been moved and stopped. In this way, blurred video images due to the motion of the tele-camera according to PTZ control will not be displayed, whereby stable video images can be displayed and recorded.

In the configuration described in JP-A-2006-238325, although the amount of blur of motion images is reduced, motion images whose imaging field of view quickly changes and greatly moves in response to PTZ drive control are still displayed, so that the problem of causing the user to feel uncomfortable with images the user is looking at is not solved. Further, when such motion images undergo compression coding and are then transmitted, there is typically increase in the amount of data because such motion images contain larger movement.

Further, in the camera system described in JP-A-2006-238325, it is necessary to use two cameras, the tele-camera and the wide-camera. In contrast, in the present embodiment, since the switching of an image signal to be transmitted between a picked-up motion image signal and a still image signal is carried out, for example, as image signal processing in the teleconference terminal apparatus 1, the present embodiment may require only one imaging apparatus and is hence advantageous, for example, in terms of cost.

As described above, in the present embodiment, a received still image to be displayed during a period in which the PTZ drive control is being carried out is acquired from received motion images that have been displayed, attempting not to cause the user to feel uncomfortable. However, it is conceivable that some users consider a still image switched from motion images that have been displayed, for example, resulting from a communication trouble or a malfunction.

Figure 5:
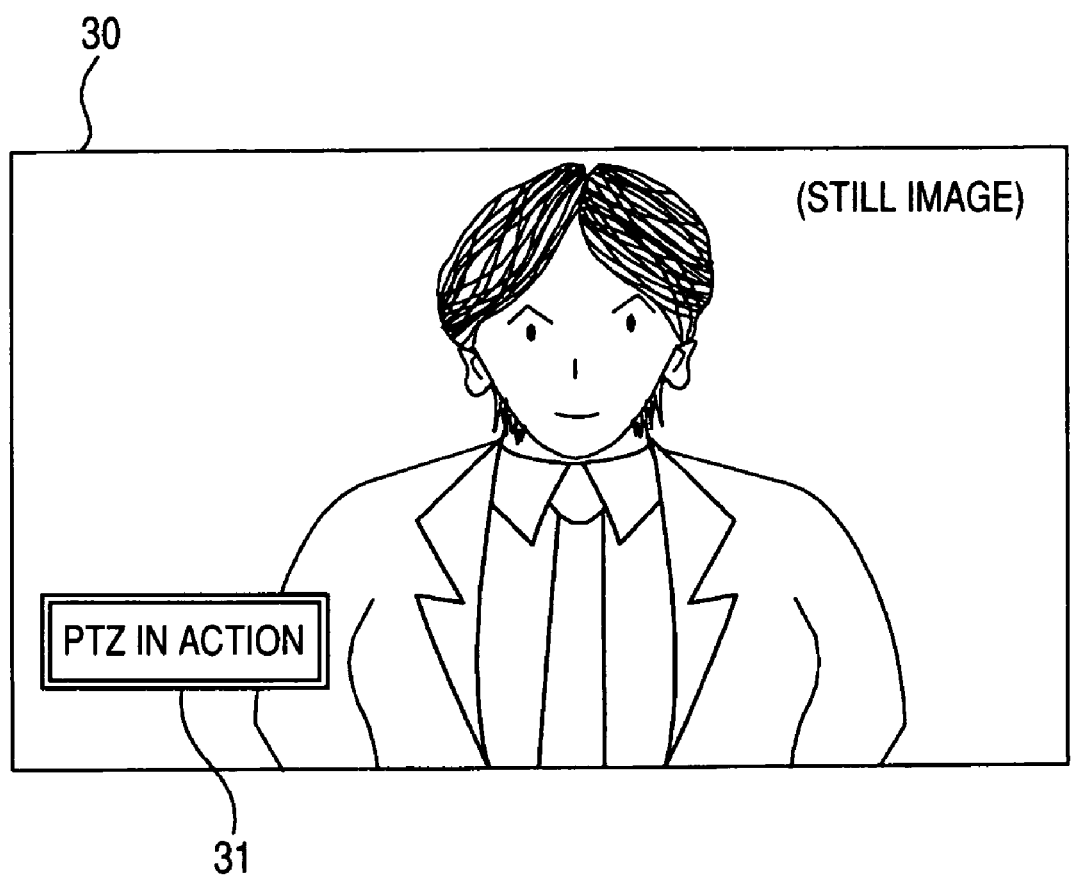
FIG. 5 shows an exemplary display mode in a display screen of a far-end display apparatus when PTZ drive control is carried out in a near-end teleconference terminal apparatus according to the first embodiment.

To address the problem, in the present embodiment, the display mode shown in FIG. 5 can be employed when the far-end display apparatus 4-2 displays a still image signal as a received image.

FIG. 5 shows an image displayed on a display screen 30 of the far-end display apparatus 4-2, for example, during a period from the point t1 to the point t2 in FIG. 4C.

The whole display screen 30 displays a still image obtained by outputting and displaying a received still image signal as a received image. A partial image in the form of a PTZ action executed indicating image 31 is displayed (superimposed) on the received still image.

The PTZ action executed indicating image 31 shows that the PTZ drive control is being carried out in response to a PTZ preset operation on the counterpart side from which an image signal that forms a received image is transmitted. Therefore, the user who has looked at the received image in which the PTZ action executed indicating image 31 is displayed can understand that the PTZ drive control is currently being carried out and hence the displayed imaged has been switched to a still image. In this case, the user will not consider the displayed still image indicates a malfunction.

[Exemplary Process Procedure]

Figure 6:
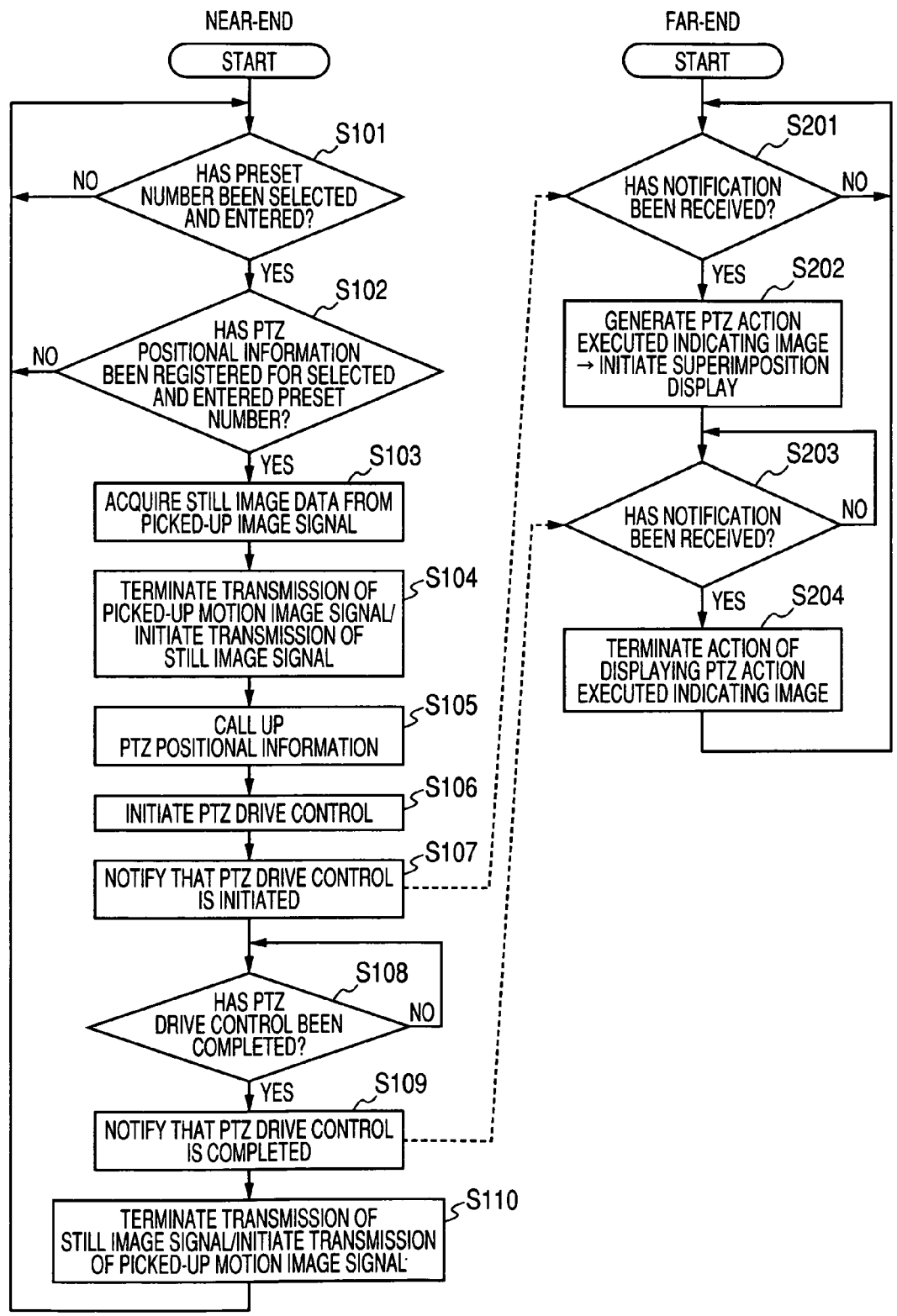
FIG. 6 is a flowchart showing an exemplary process procedure carried out by the near-end and far-end teleconference terminal apparatus according to the first embodiment.

FIG. 6 is a flowchart showing an exemplary procedure carried out by the near-end teleconference terminal apparatus 1-1 and the far-end teleconference terminal apparatus 1-2 to display the received image described with reference to FIGS. 4A, 4C, and 5.

First, in the step S101 the near-end teleconference terminal apparatus 1-1 waits for a PTZ preset operation of selecting and entering a preset number for the PTZ preset function. When it is judged that a preset number has been selected and entered, the control proceeds to the step S102.

In the step S102, it is judged whether or not PTZ positional information has been registered for the preset number selected and entered by the PTZ preset operation carried out in the step S101. When PTZ positional information has been registered and hence the judgment result is Yes, the control proceeds to the step S103, whereas when the judgment result is No, the control returns to the step S101. That is, the step S102 is a procedure for judging whether or not the selected and entered preset number is valid.

In the next step S103, still image data is acquired from an image signal obtained through imaging performed by the imaging apparatus 2-1 and the acquired still image data is held. This image signal processing is carried out by the image signal processing/display controller 11 to which the imaging apparatus 2-1 has inputted the image signal under the control of the controller 18.

In the step S104, as the action of transmitting the image signal to the far-end teleconference terminal apparatus 1-2, the transmission of the image signal containing motion images (picked-up motion image signal) picked up by the imaging apparatus 2-1 is terminated, but, instead, an image signal for displaying the still image data (still image signal) as an image acquired in the step S103 is transmitted to the far-end teleconference terminal apparatus 1-2.

To this end, for example, the controller 18 controls the image signal processing/display controller 11 to terminate the action of outputting the picked-up motion image signal inputted from the imaging apparatus 2-1 to the encoder 12, but, instead, controls the image signal processing/display controller 11 to carry out the action of outputting the image signal based on the still image data held in the step S103 to the encoder 12.

In the step S105, PTZ positional information that corresponds to the preset number selected and entered by the PTZ preset operation is read from preset information 19a stored in the storage unit 19. In the next step S106, based on the PTZ positional information read in the step S105, the PTZ drive controller 15 is instructed to initiate the PTZ drive control. In response to the PTZ drive control, the imaging field of view of the imaging apparatus 2-1 connected to the near-end teleconference terminal apparatus 1-1 is changed.

At the same time when the process in the step S106 is carried out, the near-end teleconference terminal apparatus communicates with the far-end teleconference terminal apparatus 1-2 to notify that the PTZ drive control is initiated in response to the PTZ preset operation, as indicated by the next step S107.

In the step S108, the near-end teleconference terminal apparatus waits for the completion of the PTZ drive control initiated in the step S106. The completion of the PTZ drive control can be judged, for example, when the PTZ drive controller 15 notifies the controller 18 that as a result of the PTZ drive control, the zoom mechanism 2a in the imaging apparatus 2-1 and the pan mechanism 3a and the tilt mechanism 3b in the mounting base 3-1 have been moved to the positions indicated by the PTZ positional information. When it is judged that the PTZ drive control is completed in the step S108, the control proceeds to the step S109.

In the step S109, the near-end teleconference terminal apparatus communicates with the far-end teleconference terminal apparatus 1-2 to notify that the PTZ drive control is completed.

At the same time, in the step S10, as the action of transmitting the image signal to the far-end teleconference terminal apparatus 1-2, the transmission of the still image signal initiated in the step S104 is terminated, but, instead, the transmission of the still image signal is switched to transmission of the normal picked-up motion image signal. The control then returns to the step S101.

To this end, the controller 18 instructs the image signal processing/display controller 11 to terminate the action that has been carried out, that is, the action of outputting the still image data (still image signal). At this point, the still image data held in the image signal processing/display controller 11 may be discarded.

The action of outputting the still image data control is then switched to the action of outputting the picked-up motion image signal inputted from the imaging apparatus 2-1 to the encoder 12.

An exemplary process procedure carried out by the far-end teleconference terminal apparatus 1-2 will be described. It is assumed that when the procedure shown in FIG. 6 is carried out, the teleconference terminal apparatus 1-2 operates in such a way that the display screen 30 of the display apparatus 4-2 displays the image signal transmitted from the near-end teleconference terminal apparatus 1-1 in the form of an image.

First, in the step S201, the far-end teleconference terminal apparatus 1-2 waits for receipt of the notification sent in the step S107 from the near-end teleconference terminal apparatus 1-1 indicating that the PTZ drive control is initiated. When it is judged that the notification has been received, the control proceeds to the step S202.

In the step S202, the far-end teleconference terminal apparatus 1-2 initiates display control in which the PTZ action executed indicating image 31 described above with reference to FIG. 5 is superimposed on (combined with) the received image currently displayed on the display apparatus 4-2. Thereafter, in the step S203, the far-end teleconference terminal apparatus 1-2 waits for receipt of the notification sent from the near-end teleconference terminal apparatus 1-1 indicating that the PTZ drive control is completed. When it is judged that the notification indicating that the PTZ drive control is completed has been received, in the step S204, the action of displaying the PTZ action executed indicating image 31 that has been superimposed on the received image is terminated. The control then returns to the step S201.

The period from the timing when the notification indicating that the PTZ drive control is initiated is received in the step S201 to the timing when the notification indicating that the PTZ drive control is completed is received in the step S203 corresponds to the period in which the near-end teleconference terminal apparatus 1-1 executes the processes in the steps S104 and S110 to transmit a still image signal as the image signal, and is the period in which the far-end teleconference terminal apparatus 1-2 displays a still image as the received image. During this period, in the step S202 carried out by the far-end teleconference terminal apparatus 1-2, the PTZ action executed indicating image 31 is superimposed and displayed on the received image. That is, as described with reference to FIG. 5, during the period in which a still image is displayed as the received image, the PTZ action executed indicating image 31 is superimposed and displayed on the received image.

As appreciated from the procedure shown in FIG. 6, before the far-end teleconference terminal apparatus 1-2 displays the PTZ action executed indicating image 31, the near-end teleconference terminal apparatus 1-1 sends the notification indicating that the PTZ drive control is carried out in response to a PTZ preset operation and the far-end teleconference terminal apparatus 1-2 receives the notification. In other words, the partial image, which is the PTZ action executed indicating image 31, is not combined with an image that corresponds to a still image signal in the near-end teleconference terminal apparatus 1-1. For example, the near-end teleconference terminal apparatus 1-1 can, of course, transmit a still image signal obtained by combining a still image with the PTZ action executed indicating image 31. In this case, however, combining the PTZ action executed indicating image 31 increases, although temporarily, the amount of differential information in a compression-coded image signal, resulting in congestion of the traffic. In contrast, the amount of data necessary to send and receive notification is very small, and hence there is almost no increase in traffic, which is advantageous in terms of data transmission.

Further, according to the procedure shown in FIG. 6, the near-end teleconference terminal apparatus 1-1 acquires a still image from an image signal (picked-up image signal) obtained through imaging performed by the imaging apparatus 2-1 at a timing before the PTZ drive control is initiated in response to a PTZ preset operation. It is conceivable, for example, that the teleconference terminal apparatus 1 acquires a still image after the PTZ drive control is initiated in response to a PTZ preset operation (immediately after the PTZ drive control is initiated, for example). However, if a still image is acquired after the PTZ drive control is initiated, the imaging field of view of the imaging apparatus 2-1 may have already changed, and hence the obtained still image may be blurred or otherwise affected. In consideration of this, as shown in FIG. 6, a still image is preferably acquired from a picked-up image signal obtained at a timing before the PTZ drive control is initiated in response to a PTZ preset operation.

<2. Second Embodiment>
[Display Actions in Response to PTZ Drive Control (Second Embodiment)]

FIGS. 7A and 7B show transition of a received image according to the PTZ drive control in a second embodiment. FIG. 7A shows, as in FIG. 4A, an exemplary situation of the PTZ drive control in response to a PTZ preset operation carried out in the near-end teleconference terminal apparatus 1-1. FIG. 7B corresponds to FIG. 7A and shows transition of a received image displayed on the display apparatus 4-2 in the far-end teleconference terminal apparatus 1-2.

In the second embodiment, in the period before the point t1 during which the PTZ drive control is halted, motion images are first displayed as received images. When the point t1 is reached, assume that the PTZ drive control is initiated in response to a PTZ preset operation. The near-end teleconference terminal apparatus 1-1 then extracts still image data from the picked-up motion image signal at the timing t1, and transmits the still image data during the period starting from the point t1. In this way, as the received image, the action of displaying the motion images is stopped at the timing t1, and thereafter, the still image is continuously displayed until the point t2 is reached and the PTZ drive control is halted. The above actions are the same as those described in the first embodiment with reference to FIG. 4C.

In comparison with the received image in the first embodiment, when the point t2 is reached, the action of displaying the still image is terminated and immediately switched to the action of displaying motion images (picked-up motion images) contained in the picked-up motion image signal from the near-end teleconference terminal apparatus 1-1.

On the other hand, in the received image in the second embodiment, during the period t2-t3 from the point t2 to the point t3, a point when a certain length of time has passed from the point t2, the still image that has been displayed until the point t2 is reached fades out, and at the same time, the picked-up motion images fade in. When the point t3 is reached, only the motion images are displayed. After the point t3, only the motion images are continuously displayed. The period t2-t3 in which a still image fades out and motion images fade in is also hereinafter referred to as a "fading period." The received image displayed during the fading period, in which picked-up motion images fade in and a still image fades out, is also referred to as a "fading image."

FIGS. 8A to 8D show an example of how to display the fading image.

Figure 8A:
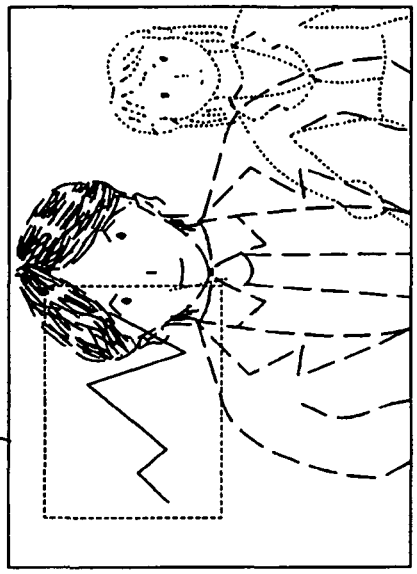
FIGS. 8A to 8D show an exemplary display mode in the display screen of the far-end display apparatus when PTZ drive control is carried out in the near-end teleconference terminal apparatus according to the second embodiment.
Figure 8C:
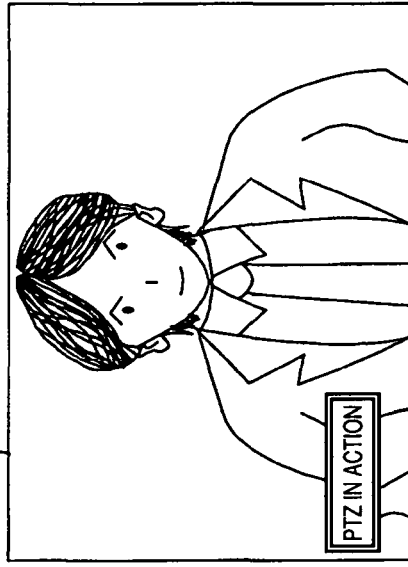
Figure 8B:
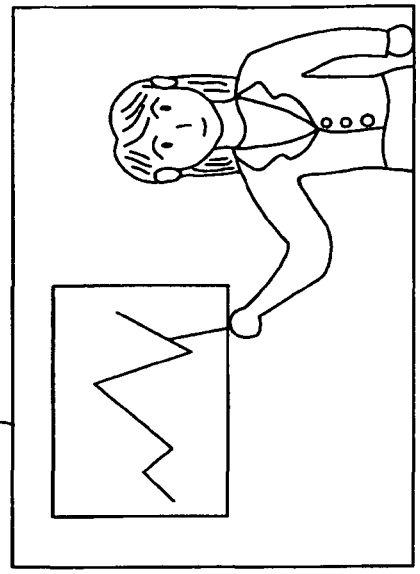

FIG. 8A shows a state in which a still image is displayed during the period from the point t1 to the point t2 in which the PTZ action is being carried out. In the second embodiment, the PTZ action executed indicating image 31 is also superimposed on the still image, as shown in FIG. 8A.

Figure 8D:
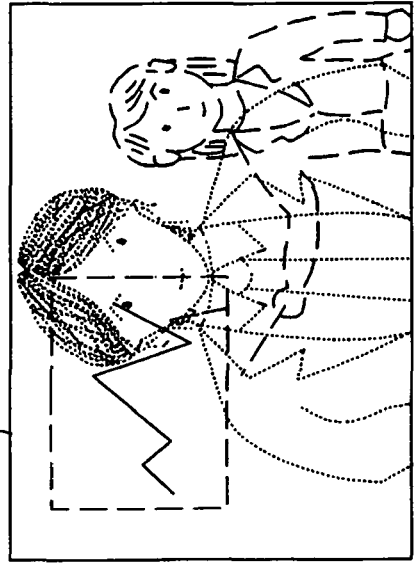

Under such a condition, assume that the PTZ drive control is halted when the point t2 is reached. As shown in the transition from FIG. 8B to FIG. 8C, the received image changes in such a way that the still image that has been displayed gradually disappears (fades out) and at the same time, picked-up motion images gradually appear (fade in). At the timing when the point t3 is reached, as shown in FIG. 8D, the still image completely disappears, but, instead, only the picked-up motion images are displayed. Thereafter, the motion images are displayed.

For example, when a still image is switched to picked-up motion images instantly, it is conceivable that some users may feel uncomfortable with the received image or feel tired to some degree. In contrast, providing the fading period as described in the second embodiment allows a still image to be switched to picked-up motion images slowly in a certain length of time, whereby the user will not have uncomfortable feeling or any other similar feeling unlike the above situation.

Further, providing the fading period as described in the second embodiment is advantageous in terms of a codec (encoding, decoding) process that corresponds to the image compression coding.

That is, when a received image is instantly switched from a still image to motion images, for example, at the point t2, a significantly large difference in motion is generated from the viewpoint of motion images. In this case, the encoder 12 in the near-end teleconference terminal apparatus 1-1 will perform compression coding according to the large motion. In this case, since a large amount of data is handled, the processing load increases accordingly. Further, a large processing load is also applied to the decoder 13 in the far-end teleconference terminal apparatus 1-2 when such large-motion images are decoded.

In contrast, when a still image gradually changes to motion images as described in the second embodiment, the processing load described above on each of the encoder 12 and the decoder 13 is reduced.

Moreover, the second embodiment is advantageous in terms of traffic of image signal transmission and reception.

That is, since the fading image gradually changes from a still image to motion images, and hence compression coding is performed on small-motion images, increase in the amount of compression-coded image data is also small. Therefore, the data rate of an image signal (compression-coded image data) transmitted in the fading period in which a still image changes to motion images does not also greatly increases, whereby the load on the traffic is also small.

[Exemplary Configuration of Image Signal Processing/Display Controller]

A description will be made of an exemplary configuration of the technology for displaying a received image according to the second embodiment described with reference to FIGS. 7A, 7B and 8A to 8D.

Figure 9:
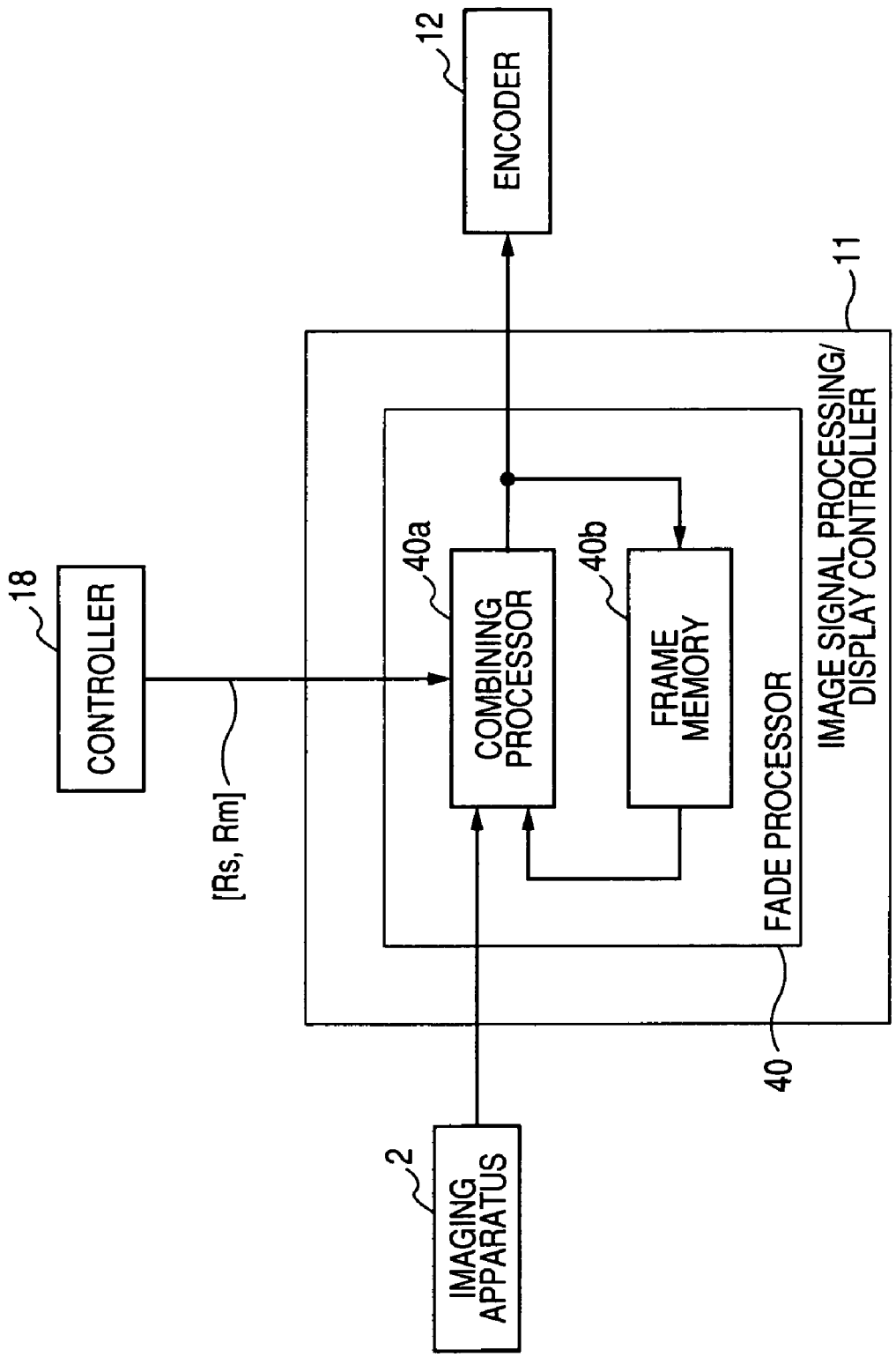
FIG. 9 shows an exemplary configuration of an image signal processing/display controller 11 according to the second embodiment.

First, refer to FIG. 9, which shows an exemplary configuration of the image signal processing/display controller 11 according to the second embodiment. The configuration shown in FIG. 9 shows a functional portion corresponding to a fading image display function provided in the image signal processing/display controller 11. The other functional portions are omitted in FIG. 9.

For confirmation, the exemplary configuration of the teleconference system shown in FIG. 1 and the internal configuration of the teleconference terminal apparatus 1 shown in FIG. 2 are also used in the second embodiment.

FIG. 9 shows a fade processor 40 as the functional portion that displays a received image during the fading period in the image signal processing/display controller 11. The fade processor 40 includes a combining processor 40a and a frame memory 40b as shown in FIG. 9.

The combining processor 40a receives inputs of a picked-up motion image signal from the imaging apparatus 2 and an image signal that corresponds to one-frame image data (still image signal) read from the frame memory 40b. The combining processor 40a then combines the inputted picked-up image signal with the still image signal into a single frame image in accordance with a motion image combination ratio $Rm$ for the picked-up motion image signal and a still image combination ratio $Rs$ for the still image signal, both the ratios being set and outputted by the controller 18, and outputs the resultant image as a single image signal to the encoder 12.

The combination ratios $Rm$ and $Rs$ used herein respectively represent the proportions of the picked-up motion images and the still image in a single-frame image, and satisfy the following equations, $0 \leq Rm \leq 1$ and $0 \leq Rs \leq 1$. The ratios also satisfy the relationship $Rm = 1 - Rs$. The combination ratios $Rm$ and $Rs$ can be, for example, respectively handled as the ratio of the number of pixels that correspond to the picked-up motion image in a single frame to the total number of pixels that correspond to the same single-frame image and the ratio of the number of pixels that correspond to the still image to the total number of pixels described above.

The frame memory 40b holds, for example, image signal data on a frame basis, that is, frame image data. In this case, data written to the frame memory 40b is an image signal outputted from the combining processor 40a. Further, as described above, data read from the frame memory 40b is inputted as a still image signal to the combining processor 40a.

In this description, writing and reading data to and from the frame memory 40b is, for example, carried out by the controller 18.

[Exemplary Process Actions]

A description will be made of an exemplary process procedure carried out by the near-end teleconference terminal apparatus 1-1 and the far-end teleconference terminal apparatus 1-2 to display a received image according to the second embodiment with reference to the flowcharts shown in FIGS. 10 and 11.

Figure 10:
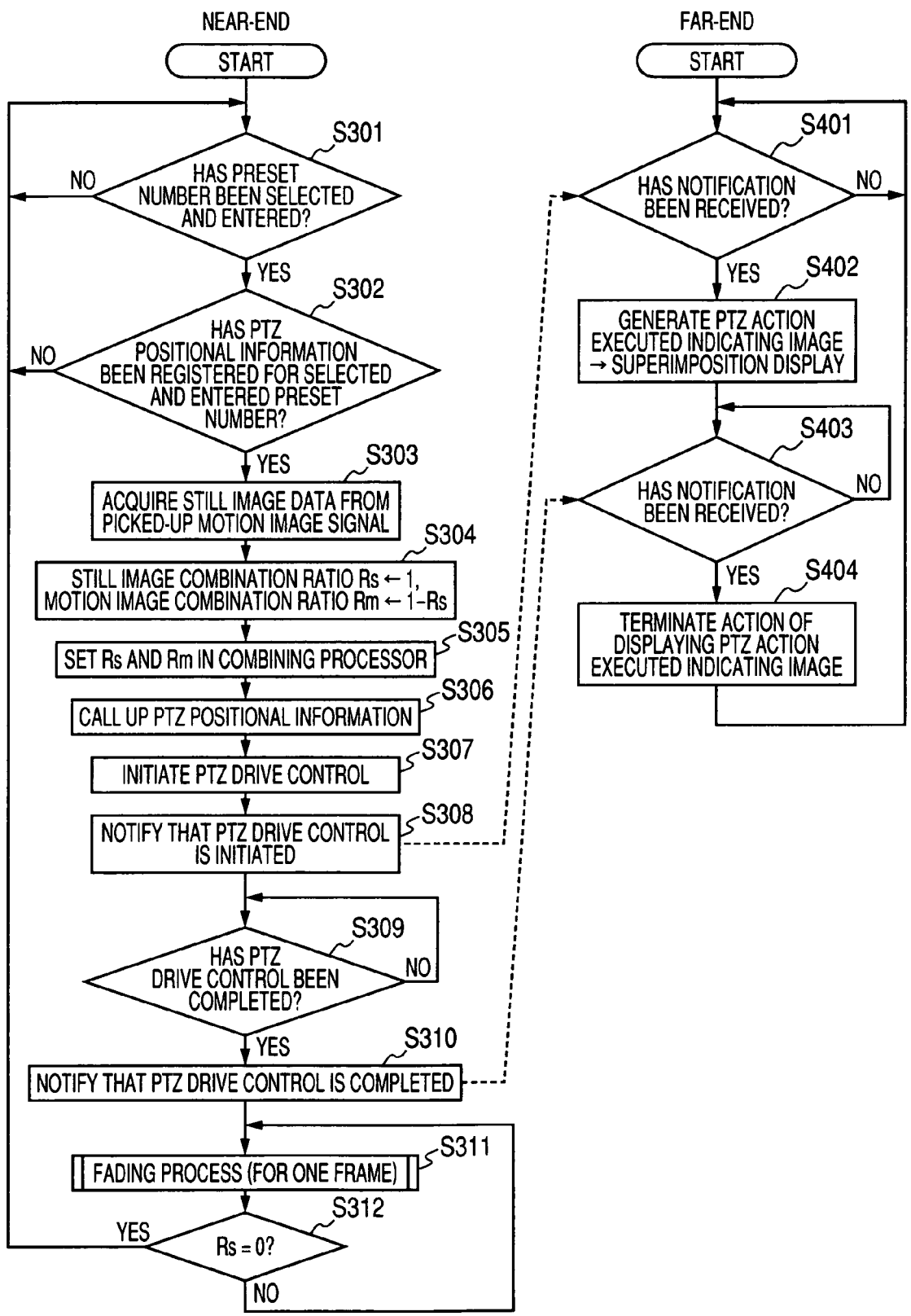
FIG. 10 is a flowchart showing an exemplary process procedure executed by the near-end and far-end teleconference terminal apparatus according to the second embodiment.

First, the procedure from the steps S301 to S303 in FIG. 10 executed by the near-end teleconference terminal apparatus 1-1 is the same as the procedure from the steps S101 to S103 in FIG. 6 according to the first embodiment.

In the near-end teleconference terminal apparatus 1-1, however, as an initial setting, the motion image combination ratio Rm is set to 1 and the still image combination ratio Rs is set to 0. In this way, for example, when the process in the step S301 is first executed, the near-end teleconference terminal apparatus 1-1 transmits only a picked-up motion image signal.

As the process in the step S303, for example, at the timing when operations of selecting and entering a preset number are detected in the step S301, the controller 18 extracts one-frame image data (frame image data) from an image signal outputted from the combining processor 40a and writes the one-frame image data.

At the timing when the operations of selecting and entering a preset number is detected in the step S301, the combining processor 40a handles only the picked-up motion image signal because the motion image combination ratio Rm is set to 1 and the still image combination ratio Rs is set to 0. The frame memory 40b therefore holds a single frame image data extracted from the picked-up motion images that have been displayed.

The controller 18 maintains the setting of the motion image combination ratio Rm=1 and the still image combination ratio Rs=0 immediately before the step S304 is reached. When the step S304 is reached, however, the motion image combination ratio Rm is changed to 0 and the still image combination ratio Rs is changed to 1, and the changed motion image combination ratio Rm and still image combination ratio Rs are set. in the combining processor 40a in the step S305.

In response to the process in the step S305, the combining processor 40a, which has outputted only the picked-up motion image signal from the imaging apparatus 2, now outputs only the frame image data read from the frame memory 40b as the image signal.

The far-end teleconference terminal apparatus 1-2 receives the image signal, decodes it, and outputs and displays it. That is, in the display apparatus 4-2 in the far-end teleconference terminal apparatus 1-2 at this point, the displayed image changes in such a way that the motion images that have been displayed are stopped and the last motion image is displayed as a still image.

In the steps S306 to S310, as in the steps S105 to S109 in FIG. 6, the PTZ drive control is carried out in response to a PTZ preset operation, and the far-end teleconference terminal apparatus 1-2 is notified that the PTZ drive control is initiated and then terminated.

In the step S311, the fading process for one frame is carried out. The fading image transits from the state in which only the still image is displayed to the state in which only motion images are displayed and the transition takes a period that corresponds to the number of certain successive frames, for example, the period indicated as the period t2-t3 shown in FIGS. 7A and 7B.

The fading process used herein is a process of providing a change in received image for only one frame, as the image signal processing for producing the fading image described above.

Figure 11:
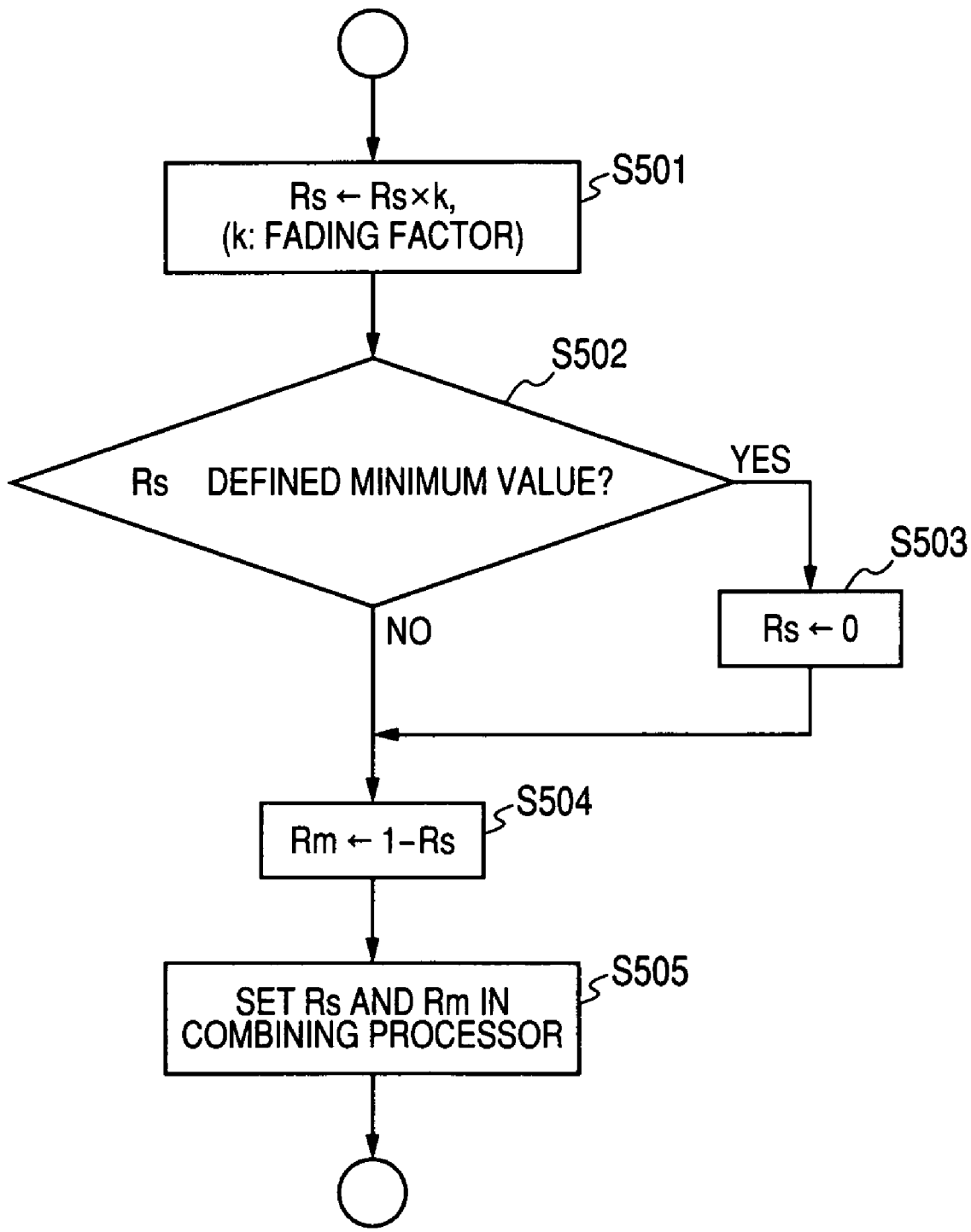
FIG. 11 is a flowchart showing an exemplary procedure of a fading process in FIG. 10.

FIG. 11 shows a specific example of the fading process in the step S311.

In FIG. 11, first, in the step S501, the still image combination ratio Rs, which has been set to 1, is updated by using the operation expressed by the following equation.

$$Rs = Rs \times k \quad \text{(Equation 1)}$$

In the equation, k represents a fading factor and is set in advance to a predetermined value within the range $0<k<1$. The value of the still image combination ratio Rs is thus updated to a value smaller than the previous value.

The fading factor k may be arbitrarily set within the range $0<k<1$. Setting the fading factor k allows the number of frames, that is, the length of time as the fading period in which a fading image is displayed to be set. Therefore, as a conceivable example of how to determine the fading factor k, the length of a necessary fading period is first determined, and then a fading factor k from which the length of the fading period is derived is determined.

In the next step S502, it is judged whether or not the still image combination ratio Rs updated in the step S501 is smaller than or equal to a value that may be considered as zero (defined minimum value). When the judgment result is No, the process in the step S503 is skipped and the control proceeds to the step S504. When the judgment result is Yes, zero is substituted into the still image combination ratio Rs in the step S503, and the control proceeds to the step S504.

In the step S504, in accordance with the updated still image combination ratio Rs, the motion image combination ratio Rm is also updated. To this end, the operation expressed by the following equation, Rm=1−Rs, may be performed on the motion image combination ratio Rm.

In the step S505, the updated still image combination ratio Rs and motion image combination ratio Rm are set in the combining processor 40a. The combining processor 40a then combines the still image signal at a ratio smaller than that in the preceding frame, combines the picked-up motion image signal at a ratio greater than that in the preceding frame, and outputs the resultant image signal as the current frame image signal. In this way, the fading image changes in such a way that the proportion of the picked-up motion images increases and the proportion of the still image decreases, as compared to the preceding frame.

Referring back to FIG. 10, after the fading process has been executed in the step S311, it is judged in the step S312 whether or not the still image combination ratio Rs is 0 (the motion image combination ratio Rm is 1).

When the judgment result is Yes, the combining processor 40a has carried out the combination process with the still image combination ratio Rs set to 0 and the motion image combination ratio Rm set to 1. That is, the combining processor 40a outputs an image signal including only the picked-up motion image signal. The fading image has therefore reached the state in which only the picked-up motion images are displayed. In relation to FIGS. 7A and 7B, this means that the point t3 has been reached and the fading period has been completed. In this case, the control returns to the process in the step S301.

When the judgment result is No in the step S312, the fading image has not yet reached the state in which only the picked-up motion images are displayed. In this case, the control returns to the step S311, and the fading process for the next frame period is repeated.

In FIG. 10, the processes carried out by the far-end teleconference terminal apparatus 1-2 (steps S401 to S404) are the same as the processes carried out by the far-end teleconference terminal apparatus 1-2 (steps S201 to S204) shown in FIG. 6. That is, the configuration of the far-end teleconference terminal apparatus is the same both in the first and second embodiments.

For confirmation, the configuration of the fade processor 40 shown in FIG. 9 can also be used in the first embodiment.

In this case, in the step S103 in FIG. 6, frame image data is extracted from the image signal outputted from the combining processor 40a at that point and written to the frame memory 40b, as in the step S303 in FIG. 10.

Further, as the process in the step S104, the controller 18 changes the motion image combination ratio Rm to 0 and the still image combination ratio Rs to 1, and the changed motion image combination ratio Rm and still image combination ratio Rs are set in the combining processor 40a, as in the step S305. That is, the processes similar to those in the steps S304 and S305 in FIG. 10 are executed.

Further, as the step S110, the controller 18 sets the motion image combination ratio Rm of 1 and the still image combination ratio Rs of 0 in the combining processor 40a.

How to display a fading image, that is, how to fade out a still image, fade in picked-up motion images, and display them should not limited to a specific one, but can be considered in a variety of ways.

In practice, a teleconference system is often configured in such a way that three or more teleconference terminal apparatus 1 communicate with one another to transmit and receive image signals obtained through imaging and each of the teleconference terminal apparatus 1 outputs and displays the received image. In the present embodiment, to simplify the description, it is assumed that two teleconference terminal apparatus 1 form the teleconference system, but the configuration based on the present embodiment can be used without any problem to form a teleconference system using three or more teleconference terminal apparatus described above.

Further, the configuration of the teleconference system and the internal configuration of the teleconference terminal apparatus 1, for example, shown in FIGS. 1 and 2 may be changed as appropriate.

The process procedures shown in the flowcharts in FIGS. 6, 10, and 11 can be considered as those obtained by executing a program in the CPU that forms the controller 18. It is conceivable that the program is written and stored, for example, in the ROM that forms the controller 18 or the storage unit 19 at the time of manufacture, or first stored on a removable storage medium and then stored in the storage unit 19 or other storage components by installing (including updating) the program from the storage medium. It is also conceivable that the program is installed under the control of another host apparatus via a data interface. It is further conceivable that the program is stored in a storage device in a server or other apparatus in a network and then acquired, for example, by downloading the program from the server via the network.

It should be understood by those skilled in the art that various modifications, combinations, sub-combinations and alterations may occur depending on design requirements and other factors insofar as they are within the scope of the appended claims or the equivalents thereof.

What is claimed is:

1. A teleconference terminal apparatus comprising:
    imaging field changing control means for carrying out control for changing the position of an imaging field changing unit designed to change the position of the imaging field of view of an imaging unit that forms a teleconference system;
    preset information managing means for holding and managing preset information including positional information that specifies the position of the imaging field changing unit;
    image signal transmitting means for outputting and transmitting an image signal to another teleconference terminal apparatus, the image signal used to display an image on a display apparatus provided in the other teleconference terminal apparatus;
    still image generating means for generating still image information based on a picked-up image signal obtained through imaging performed by the imaging unit; and
    transmitted image control means for controlling the image signal transmitting means to transmit an image signal based on a picked-up image signal obtained through imaging performed by the imaging unit during a first period in which the imaging field changing control means does not carry out position changing control for changing the position of the field view changing unit based on the positional information in the preset information, and controlling the image signal transmitting means to transmit, during a second period in which the position changing control is carried out, an image signal based on still image information generated by the still image generating means when the second period is initiated.

2. The teleconference terminal apparatus according to claim 1,
    wherein in a fading period in the first period that corresponds to a fixed time after the position changing control in the second period is completed, the transmitted image control means transmits an image signal obtained by combining an image signal based on still image information sent during the second period immediately before the fading period with an image signal based on a picked-up image signal in such a way that a combination ratio of the image signal based on the still image information decreases and a combination ratio of the image signal based on the picked-up image signal increases with time.

3. The teleconference terminal apparatus according to claim 1 or 2, further comprising
    indicating information sending means for sending indicating information to the other teleconference terminal apparatus, the indicating information used to display a partial image indicating that the position changing control is being carried out to be superimposed on the image displayed on the display apparatus by using the image signal for the second period.

4. The teleconference terminal apparatus according to any one of claims 1 to 3, further comprising
    image compression coding means for performing compression coding on an image signal to be outputted and transmitted from the image signal transmitting means.

5. An image transmitting method comprising the steps of:

carrying out control for changing the position of an imaging field changing unit designed to change the position of the imaging field of view of an imaging unit in a teleconference terminal apparatus that forms a teleconference system;

holding and managing preset information including positional information that specifies the position of the imaging field changing unit;

outputting and transmitting an image signal to another teleconference terminal apparatus, the image signal used to display an image on a display apparatus provided in the other teleconference terminal apparatus;

generating still image information based on a picked-up image signal obtained through imaging performed by the imaging unit; and using the image signal transmitting step to transmit an image signal based on a picked-up image signal obtained through imaging performed by the imaging unit during a first period in which position changing control for changing the position of the field view changing unit based on the positional information in the preset information is not carried out by using the imaging field changing control step, and using the image signal transmitting step to transmit, during a second period in which the position changing control is carried out, an image signal based on still image information generated in the still image generating step when the second period is initiated.

6. A teleconference terminal apparatus comprising:

an imaging field changing control section carrying out control for changing the position of an imaging field changing unit designed to change the position of the imaging field of view of an imaging unit that forms a teleconference system;

a preset information managing section holding and managing preset information including positional information that specifies the position of the imaging field changing unit;

an image signal transmitting section outputting and transmitting an image signal to another teleconference terminal apparatus, the image signal used to display an image on a display apparatus provided in the other teleconference terminal apparatus;

a still image generating section generating still image information based on a picked-up image signal obtained through imaging performed by the imaging unit; and a transmitted image control section controlling the image signal transmitting section to transmit an image signal based on a picked-up image signal obtained through imaging performed by the imaging unit during a first period in which the imaging field changing control section does not carry out position changing control for changing the position of the field view changing unit based on the positional information in the preset information, and controlling the image signal transmitting section to transmit, during a second period in which the position changing control is carried out, an image signal based on still image information generated by the still image generating section when the second period is initiated.

* * * * *